(12) United States Patent (10) Patent No.: US 12,627,679 B2

Salji (45) Date of Patent: ***May 12, 2026

(54) CYBER SECURITY SYSTEM APPLYING NETWORK SEQUENCE PREDICTION USING TRANSFORMERS

(71) Applicant: Darktrace Holdings Limited, Cambridge (GB)

(72) Inventor: Carl Joseph Salji, Bedford (GB)

(73) Assignee: Darktrace Holdings Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,524

(22) Filed: Feb. 12, 2024

(65) Prior Publication Data

US 2024/0314142 A1     Sep. 19, 2024

Related U.S. Application Data

(63) Continuation of application No. 17/187,379, filed on Feb. 26, 2021, now Pat. No. 11,936,667.

(60) Provisional application No. 63/078,092, filed on Sep. 14, 2020, provisional application No. 62/983,307, filed on Feb. 28, 2020.

(51) Int. Cl.
| | |
|---|---|
| *H04L 9/40* | (2022.01) |
| *G06N 3/04* | (2023.01) |
| *G06N 3/08* | (2023.01) |
| *G06N 20/00* | (2019.01) |
| *H04L 43/028* | (2022.01) |
| *H04L 67/141* | (2022.01) |

(52) U.S. Cl.
CPC ...... *H04L 63/1416* (2013.01); *H04L 63/1425* (2013.01); *H04L 63/1433* (2013.01); *H04L 63/1441* (2013.01); *G06N 3/08* (2013.01); *G06N 20/00* (2019.01); *H04L 63/145* (2013.01)

(58) Field of Classification Search
CPC .............. H04L 63/1416; H04L 43/028; H04L 63/1425; H04L 63/1433; H04L 63/1441; H04L 67/141; H04L 63/145; G06N 20/00; G06N 3/04; G06N 3/08
See application file for complete search history.

(56) References Cited

U.S. PATENT DOCUMENTS

| | | | | |
|---|---|---|---|---|
| 9,516,053 B1* | 12/2016 | Muddu | ............... | G06F 16/9024 |
| 2004/0268314 A1* | 12/2004 | Kollman | ............. | G06F 11/3476 |
| | | | | 714/E11.204 |
| 2014/0245449 A1* | 8/2014 | Powell | ................ | H04L 63/1433 |
| | | | | 726/25 |

(Continued)

OTHER PUBLICATIONS

United States Patent and Trademark Office, Non-Final Office Action for U.S. Appl. No. 17/187,379, filed Mar. 2, 2023, 41 pages.

*Primary Examiner* — Kambiz Zand
*Assistant Examiner* — Afaq Ali
(74) *Attorney, Agent, or Firm* — Rutan and Tucker, LLP

(57) ABSTRACT

A cyber threat defense system and a method for detecting a cyber threat may use a predictor, e.g. a Transformer deep learning model, which is configured to predict a next item in the sequence of events and to detect one or more anomalies in the sequence of events. This provides a notification comprising (i) information about the one or more anomalies; and (ii) a prediction of what would have been expected.

19 Claims, 7 Drawing Sheets

(56)　　　　　　　References Cited

U.S. PATENT DOCUMENTS

| | | | |
|---|---|---|---|
| 2015/0332054 A1* | 11/2015 | Eck | H04L 63/1416 |
| | | | 726/25 |
| 2016/0241580 A1* | 8/2016 | Watters | H04L 63/20 |
| 2019/0019130 A1* | 1/2019 | Gentilhomme | G06Q 10/06316 |
| 2019/0034413 A1* | 1/2019 | Rosewell | G06F 16/2246 |
| 2019/0199736 A1* | 6/2019 | Howard | H04L 63/1425 |
| 2019/0260795 A1* | 8/2019 | Araiza | G06F 21/554 |
| 2020/0084087 A1* | 3/2020 | Sharma | H04W 24/08 |
| 2020/0112386 A1* | 4/2020 | Wetzker | H04L 5/0048 |
| 2020/0136938 A1* | 4/2020 | Atkinson | H04L 9/3066 |
| 2020/0210264 A1* | 7/2020 | Lavrentyev | G06F 11/079 |
| 2021/0380127 A1 | 12/2021 | Woo et al. | |
| 2023/0023646 A1 | 1/2023 | Xu et al. | |

\* cited by examiner

CYBER SECURITY SYSTEM APPLYING NETWORK SEQUENCE PREDICTION USING TRANSFORMERS

CROSS-REFERENCE TO RELATED APPLICATION(S)

This application claims the benefit and priority of 35 USC 120 from U.S. patent application Ser. No. 17/187,379, filed Feb. 26, 2021, titled "A CYBER SECURITY SYSTEM APPLYING NETWORK SEQUENCE PREDICTION USING TRANSFORMERS", which claims the benefit of priority of U.S. Provisional Application No. 62/983,307 entitled 'AN ARTIFICIAL INTELLIGENCE BASED CYBER SECURITY SYSTEM' filed on Feb. 28, 2020 and of U.S. Provisional Application No. 63/078,092 entitled 'AN INTELLIGENT CYBER SECURITY SYSTEM' filed on Sep. 14, 2020; the disclosure of each are hereby expressly incorporated by reference in their entirety.

NOTICE OF COPYRIGHT

FIELD

Embodiments of the design provided herein generally relate to a cyber threat defense system. In an embodiment, Artificial Intelligence is applied to analyzing cyber security threats.

BACKGROUND

In the cyber security environment, firewalls, endpoint security methods and other tools such as SIEMs and sandboxes are deployed to enforce specific policies, and provide protection against certain threats. These tools currently form an important part of an organization's cyber defense strategy, but they are insufficient in the new age of cyber threat. Legacy tools are failing to deal with new cyber threats because the traditional approach relies on being able to pre-define the cyber threat in advance, by writing rules or producing signatures. In today's environment, this approach to defend against cyber threats is fundamentally flawed:

Threats are constantly evolving—novel attacks do not match historical-attack "signatures", and even subtle changes to previously understood attacks can result in them going undetected by legacy defenses;

Rules and policies defined by organizations are continually insufficient—security teams simply can't imagine every possible thing that may go wrong in future; and Employee 'insider' threat is a growing trend—it is difficult to spot malicious employees behaving inappropriately as they are a legitimate presence on the business network.

The reality is that modern threats bypass the traditional legacy defense tools on a daily basis. These tools need a new tool based on a new approach that can complement them and mitigate their deficiencies at scale across the entirety of digital organizations. In the complex modern world it is advantageous that the approach is fully automated as it is virtually impossible for humans to sift through the vast amount of security information gathered each minute within a digital business.

Existing methods such as vulnerability scanning performed by humans are less targeted and may lead to security resource allocation in the wrong places. Also, some vulnerability scanners actually test and compromise the actual network devices themselves, which may adversely affect the network during this testing and scanning.

Cyber threat protection systems generally ingest network data to detect cyber threats but not to assess how a cyber threat might spread through a network. A human Red team of cyber security professionals typically is hired to test a network's vulnerability to cyber-attacks.

DRAWINGS

The drawings refer to some embodiments of the design provided herein in.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Example Cyber Security Appliance

Figure 1:
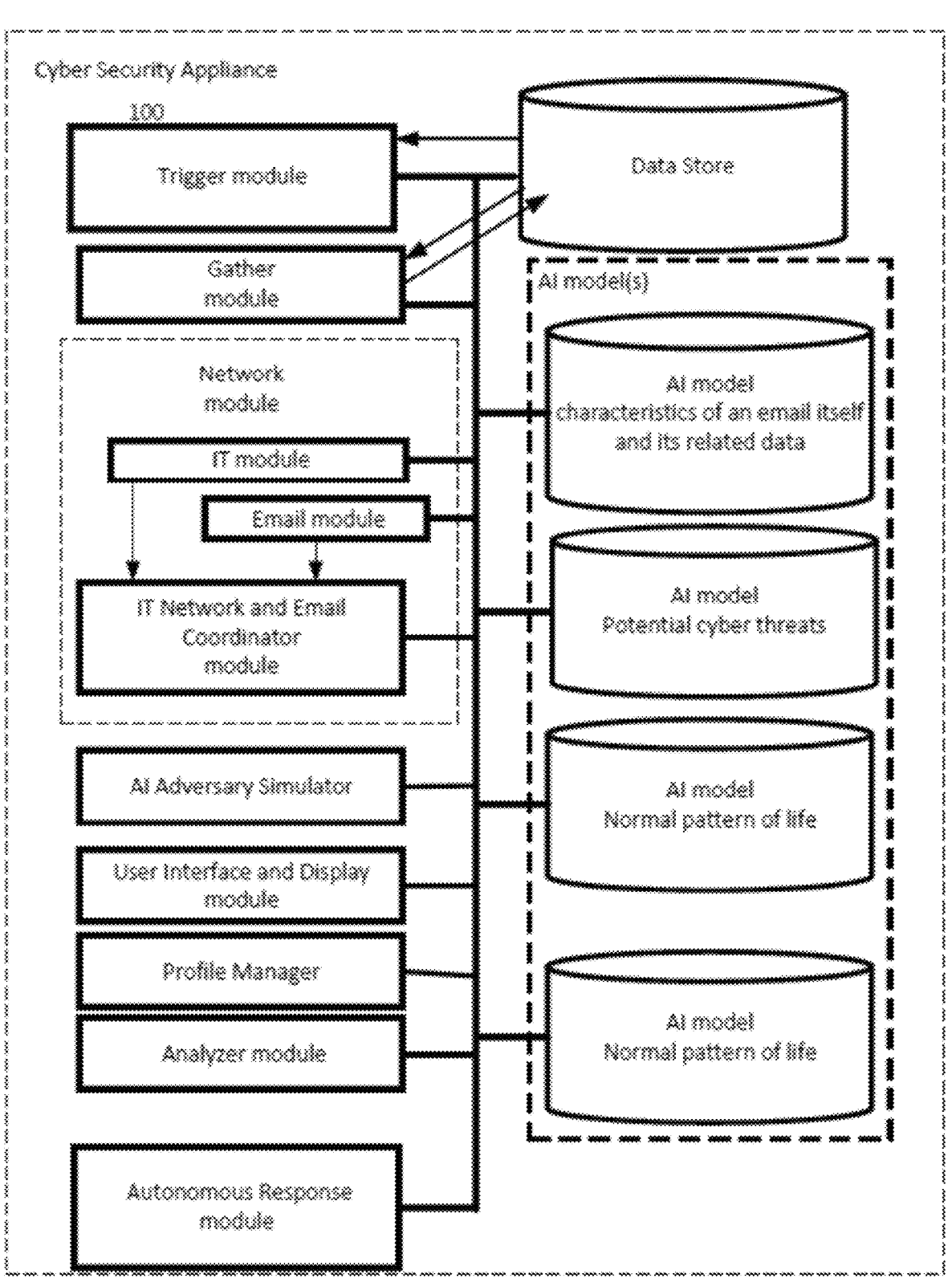
FIG. 1 illustrates a block diagram of an embodiment of a cyber-threat defense system embodying an aspect of the present invention with an analyzer module comprising a modeler configured to model network data as a sequence of events; and a predictor configured to predict a next item in the sequence of events and to detect one or more anomalies in the sequence of events.

Again, FIG. 1 shows some modules of an example cyber security appliance 100. Various Artificial Intelligence models and modules of a cyber security appliance 100 cooperate to protect a system, including but not limited to an email network, from cyber threats. The cyber security appliance 100 may include a trigger module, a gatherer module, an analyzer module, an assessment module, a formatting module, an autonomous report composer, a data store, one or more Artificial Intelligence models trained on potential cyber threats and their characteristics, symptoms, remediations, etc., one or more Artificial Intelligence models trained with machine learning on a normal pattern of life for entities in the network, one or more Artificial Intelligence models trained with machine learning on threat report generation, and multiple libraries of text and visual representations to cooperate the library of page templates to populate visual representations, such as graphs, and text on the pages of the threat report. An example network of an email system will be used to illustrate portions of a cyber security appliance 100.

Referring to FIG. 1, the trigger module may detect time stamped data indicating an event is occurring and then triggers that something unusual is happening. The gatherer module is triggered by specific events or alerts of i) an abnormal behaviour, ii) a suspicious activity, and iii) any combination of both. The trigger module may identify, with one or more AI models trained with machine learning on a normal email pattern of life for entities in the email network, at least one of i) an abnormal behaviour, ii) a suspicious activity, and iii) any combination of both, from one or more entities in the system.

The inline data may be gathered on the deployment when the traffic is observed. The gatherer module may initiate a collection of data to support or refute each of the one or more possible cyber threat hypotheses that could include this abnormal behaviour or suspicious activity by the one or more AI models trained on possible cyber threats. The gatherer module cooperates with a data store. The data store stores comprehensive logs for network traffic observed. These logs can be filtered with complex logical queries and each IP packet can be interrogated on a vast number of metrics in the network information stored in the data store.

Figure 2:
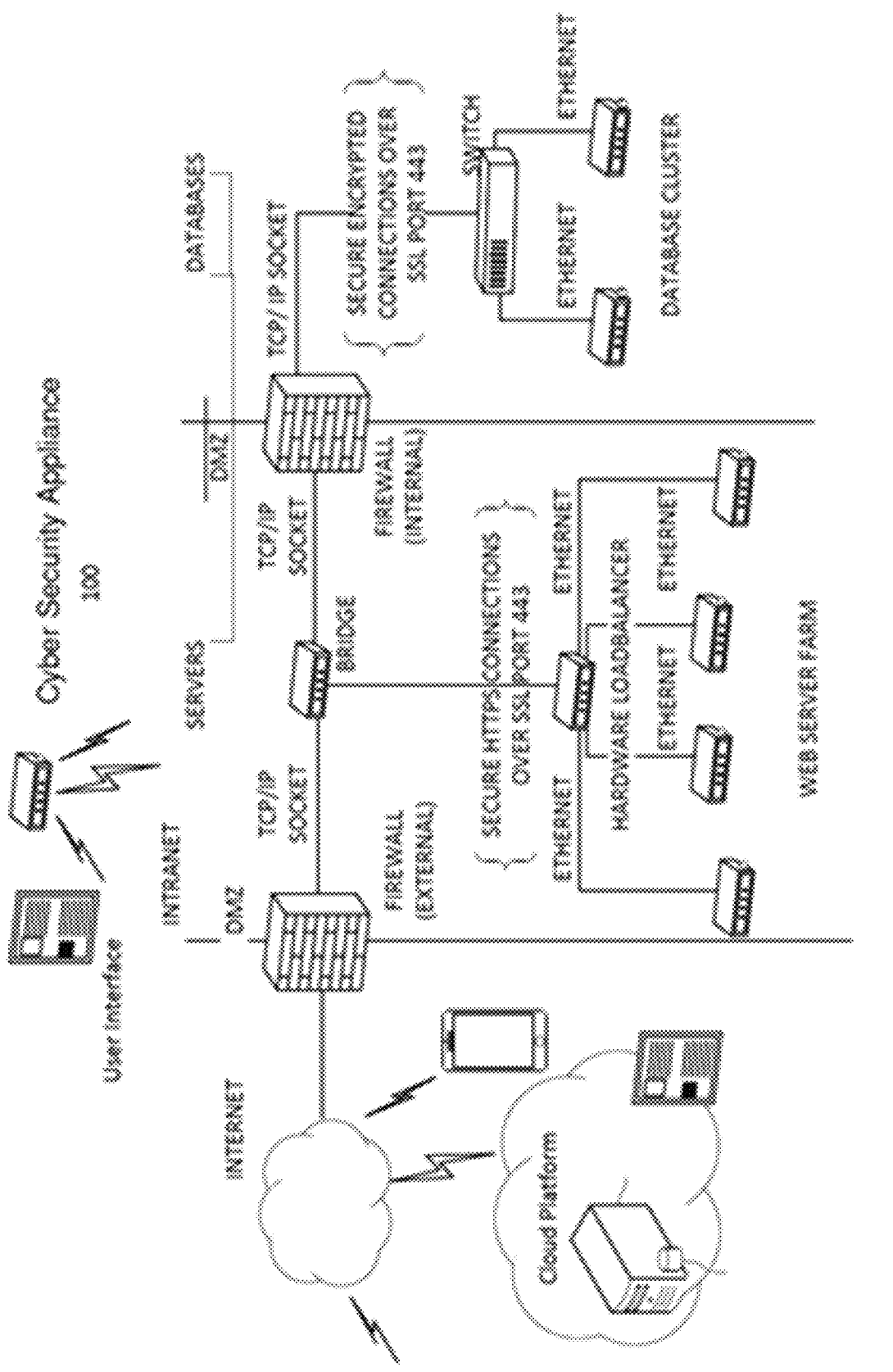
FIG. 2 illustrates a block diagram of an embodiment of the cyber-threat defense system comprising an analyzer module comprising a modeler configured to model network data as a sequence of events; and a predictor configured to predict a next item in the sequence of events and to detect one or more anomalies in the sequence of events.

The data store can store the metrics and previous threat alerts associated with network traffic for a period of time, which is, by default, at least 27 days. This corpus of data is fully searchable. The cyber security appliance 100 works with network probes to monitor network traffic and store and record the data and meta data associated with the network traffic in the data store. FIG. 2 illustrates an example cyber security appliance 100 using an intelligent-adversary simulator cooperating with a network module and network probes ingesting traffic data for network devices and network users in the network under analysis.

Referring back to FIG. 1, the gatherer module may consist of multiple automatic data gatherers that each look at different aspects of the data depending on the particular hypothesis formed for the analyzed event. The data relevant to each type of possible hypothesis can be automatically pulled from additional external and internal sources. Some data is pulled or retrieved by the gatherer module for each possible hypothesis.

The gatherer module may further extract data, at the request of the analyzer module, on each possible hypothetical threat that would include the abnormal behaviour or suspicious activity; and then, filter that collection of data down to relevant points of data to either 1) support or 2) refute each particular hypothesis of what the potential cyber threat, e.g. the suspicious activity and/or abnormal behaviour, relates to. The gatherer module and the data store can cooperate to store an inbound and outbound email flow received over a period of time as well as autonomous actions performed by the autonomous response module on that email flow. The gatherer module may send the filtered down relevant points of data to either 1) support or 2) refute each particular hypothesis to the analyzer module, comprised of one or more algorithms used by the AI models trained with machine learning on possible cyber threats to make a determination on a probable likelihood of whether that particular hypothesis is supported or refuted.

A feedback loop of cooperation between the gatherer module and the analyzer module may be used to apply one or more models trained on different aspects of this process.

The analyzer module can form one or more hypotheses on what are a possible set of activities including cyber threats that could include the identified abnormal behaviour and/or suspicious activity from the trigger module with one or more AI models trained with machine learning on possible cyber threats. The analyzer module may request further data from the gatherer module to perform this analysis. The analyzer module can cooperate with the one or more Artificial Intelligence models trained with machine learning on the normal email pattern of life for entities in the email network to detect anomalous email which is detected as outside the usual pattern of life for each entity, such as a user, of the email network. The analyzer module can cooperate with the Artificial Intelligence models trained on potential cyber threats to detect suspicious emails that exhibit traits that may suggest a malicious intent, such as phishing links, scam language, sent from suspicious domains, etc. A domain defines an administrative autonomy, authority or control within a network, such as the Internet. A domain name is a string to identify a domain. In addition, the gatherer module and the analyzer module may use a set of scripts to extract data on each possible hypothetical threat to supply to the analyzer module. The gatherer module and analyzer module may use a plurality of scripts to walk through a step-by-step process of what to collect to filter down to the relevant data points (from the potentially millions of data points occurring in the network) to make a decision what is required by the analyzer module.

The analyzer module may further analyze a collection of system data, including metrics data, to support or refute each of the one or more possible cyber threat hypotheses that could include the identified abnormal behaviour and/or suspicious activity data with the one or more AI models trained with machine learning on possible cyber threats. The analyzer module then generates at least one or more supported possible cyber threat hypotheses from the possible set of cyber threat hypotheses as well as could include some hypotheses that were not supported/refuted.

The analyzer module may get threat information from Open Source APIs as well as from databases as well as information trained into AI models. Also, probes collect the user activity and the email activity and then feed that activity to the network module to draw an understanding of the email activity and user activity in the email system.

The analyzer module learns how expert humans tackle investigations into specific cyber threats. The analyzer module may use i) one or more AI models and/or ii) rules-based models and iii) combinations of both that are hosted within the plug-in appliance connecting to the network.

The analyzer module may apply Network Sequence Prediction using a predictor, e.g. a Transformer.

Network Sequence Prediction Using Transformers

Transformer deep learning models are a new development in Natural Language Processing (Machine Learning) which transform a given sequence into another sequence when performing on operation on human text. For example, transformers are used in language translations, in which a sequence of words from a first language is transformed into a sequence of different words of a second language.

The expressions 'Transformers' and 'Transformer deep learning models' may be used interchangeably.

Structurally, a Transformer deep learning model is an encoder-decoder architecture. The encoder comprises of a set of encoding layers that processes the input iteratively one layer after another and the decoder comprises a set of decoding layers that does the same thing to the output of the encoder. Transformer deep learning models differ from sequence-to-sequence models because they do not imply any Recurrent Networks (GRU, LSTM, etc.).

The inventors have appreciated that network data may be modeled as a sequence of events which, like language, has complex dependencies.

Applied to a cyber threat defense system, an analyzer module may be configured to model network data as a sequence of events and a predictor may be configured to predict a next item in the sequence of events and to detect one or more anomalies in the sequence of events.

In turn, the predictor may provide a notification comprising (i) information about the anomaly; and (ii) a prediction of what would have been expected. Mostly in combination, (i) and (ii) are valuable information which provide context to a human analyst who can in turn make an informed decision on whether to act on the anomaly or not.

This provides an advantage over known methods for reporting anomalies which only report a deviation that is expressed in %. Such relative statement [%] is not helpful to a human analyst without any additional context.

Moreover, some known methods for reporting anomalies are merely capable of identifying an anomaly in the entirety, i.e. not in specific part, of a sequence of events. In turn, a human analyst may not know what exactly the anomaly is within a sequence of events is. It follows that known methods fail the provide sufficient context for a human analyst to make an informed decision, who cannot act on the anomaly accordingly.

To address the above problems of known methods, a cyber threat defense system may comprise an analyzer module comprising a modeler to model network data as a sequence of events, and a predictor to predict a next item in the sequence of events and to identify one or more anomalies in the sequence of events; and an autonomous response module configured to generate at least a notification in response to the analyzer module identifying the one or more anomalies.

To address the above problems of known methods, a method of detecting a cyber threat may comprise: using a modeler to model network data as a sequence of events; using a predictor to predict a next item in the sequence of events and to identify one or more anomalies in the sequence of events; and generating at least a notification in response to the predictor identifying the one or more anomalies.

The predictor may be a Transformer deep learning model.

The Transformer deep learning model may be configured to work with string data. This is advantageous because Transformer deep learning models work particularly well with string data. In turn, this makes Transformer deep learning models easier to deploy and more efficient, particularly in situations having complex dependencies, for example, network data.

The Transformer deep learning model may analyze SaaS data as is. Thus, the Transformer deep learning model is not biased by external information, for example, a user identifier, e.g. a title/role/team. This may be beneficial because a user identifier may provide a bias.

The Transformer deep learning model may be used in a variety of fields, including but not limited to SaaS, PCAPs, ICS (industrial control systems), LSTM. Transformer deep learning models may be applied to events, bytes, ICS. The Transformer deep learning models may be used to predict traffic and generate likelihoods for anomaly detection. The Network Sequence Prediction using Transformer deep learning models may thus work on any kind of network data and has been proven on DNS protocol, byte-level data in packets, and browsing data in SaaS environments.

Computationally, a Transformer may be run on a limited dataset which may be network traffic sessions (metadata about a connection), strings that represent browsing locations on a SaaS environment or bytes within a packet capture sample. The Transformer deep learning model may take a limited dataset input of sequences (such as a chain of bytes) and then produce a prediction of the next element in the sequence. A Transformer deep learning model may be used to predict the next item in a sequence or to output an anomaly score when the next actual item is seen.

Advantageously, a Transformer deep learning model requires no pre-training, which does not bias the Transformer. Further, a Transformer deep learning model may require very little training. In practice, a Transformer typically requires about 10,000 events, i.e. about one week of data. During this period the output would not be presented to the human analyst. In turn, a Transformer is easy to train online with little data. Advantageously, this allows for training the Transformer deep learning model in batches during off-hours, e.g. at night. Advantageously, this also reduces cost because training Transformer-based architectures can be very expensive, in particular for long datasets.

The Transformer deep learning model may be configured to ban or not allow human feedback as guidance for training because such manual input may bias the Transformer.

The predictor may be configured to identify an anomaly in parts of an event in a sequence. This provides an advantage over known methods for reporting anomalies, which are only able to identify an anomaly in the entirety, i.e. not in part, of a sequence of events. Thus, a predictor configured to identify an anomaly in parts of an event in a sequence may provide a more specific output.

The predictor may be configured to identify an anomaly in the sequence of events. The predictor may be configured to identify one anomaly in the sequence of events. The predictor may be configured to identify a plurality of anomalies in parts of an event in a sequence. For example, the predictor may be configured to identify two, three, four, five, six, seven, eight, nine, ten anomalies in parts of an event in a sequence.

The predictor may be configured to generate likelihoods for anomaly detection. In turn, the predictor may provide a notification comprising (i) information about the anomaly; and (ii) a prediction of what would have been expected and (iii) likelihoods for anomaly detection. For example, the likelihoods for anomaly detection may be a probability quantifying how certain the assessment is. This probability may be expressed in percent [%]. For example, confidence level may be 10%, 20%, 30%, 40%, 50%, 60%, 70%, 80%, 90%, 91%, 92%, 93%, 94%, 95%, 96%, 97%, 98%, 99% or 100%. These three aspects, i.e. (i), (ii) and (iii) above may provide an improved context to a human analyst who can in turn make an informed decision on whether to act on the anomaly or not.

The predictor may be configured to provide a notification. The output may be provided to a human analyst. The output may be provided as a graph.

The output may comprise information about the anomaly. The output may comprise a prediction of what would have been expected. The output may comprise an anomaly score.

The sequence of events may be string data. In turn, the predictor may complement existing anomaly detection which does may not handle string anomaly detection well. The predictor may also produce a more user friendly output as it may suggest a most likely result for each sequence (e.g., expected h got G) which may be displayed to an end user or queries by a service like AI Analyst. For example, the predictor may expect to see network sequences such as a sequence of packets to be coming from IP address 'X' and instead these packets are coming from IP address 'Y'.

The predictor may be configured to run on data in series or on data in parallel. In other words, the Transformer may either be run inline or triggered as part of a packet capture (PCAP) analyzer to detect anomaly on a byte level. The PCAP analyzer may detect an anomaly on a data link layer, a network layer, a transport layer, a session layer, a presentation layer and/or an application layer. In PCAP file analysis, packets may be captured from the network and analyzed with various Transformer's items in a sequence analysis/prediction.

Example 1—Network Sequence Prediction Using Transformers for Representation of User Activity Anomaly in a SaaS and Cloud Environment Proposed are two methods of representing an anomaly in user activity in a Cloud or SaaS environment, given an anomaly score computed by a machine learning algorithm. The anomaly score can be computed by an anomaly score classifier, such as the Network Sequence Prediction using Transformers trained on SaaS and/or Cloud activity, discussed above.

Figure 3:
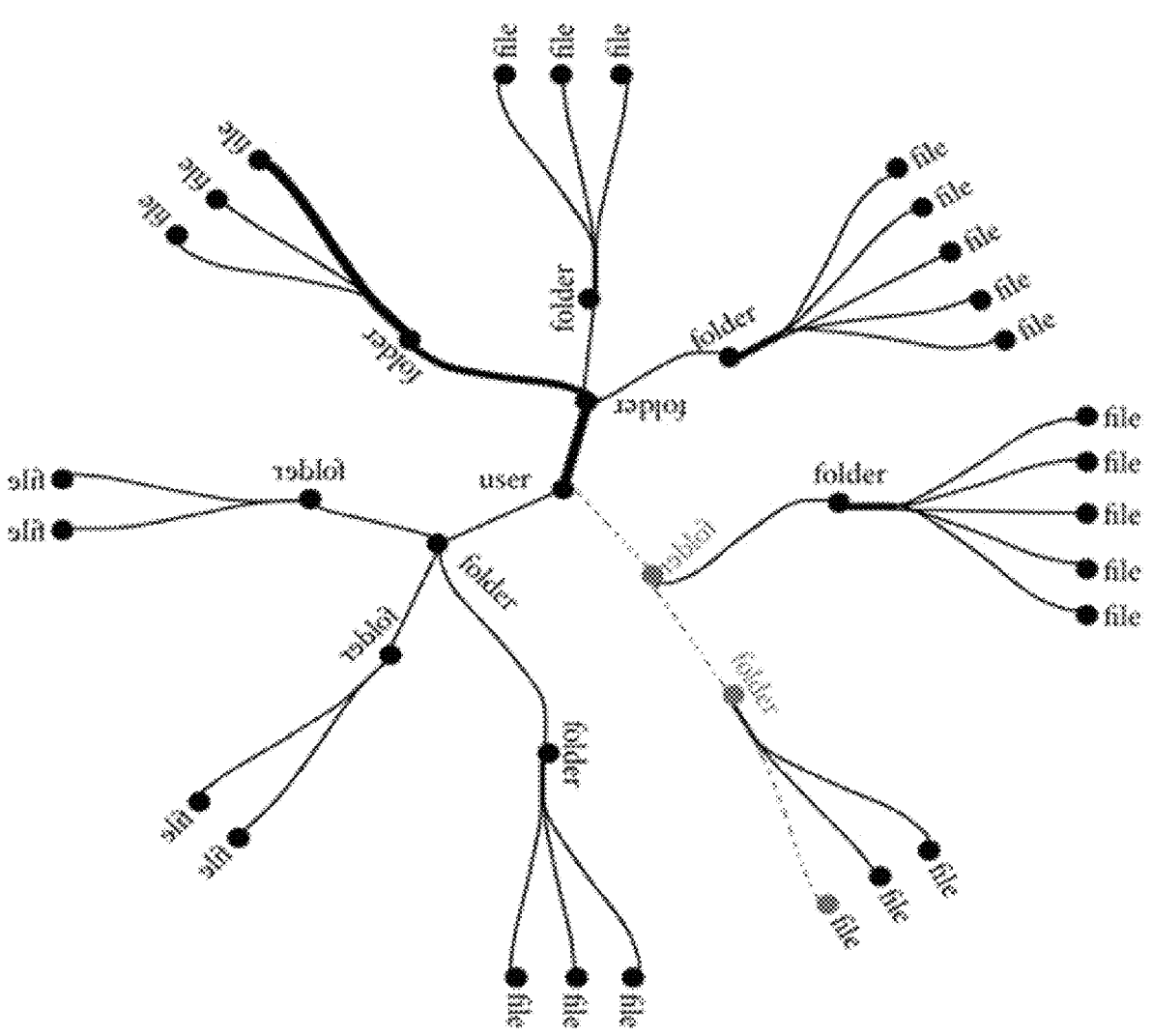
FIG. 3 illustrates a real-time or re-playable radial diagram where user activity is represented as paths between a series of nodes and their sub-nodes in a tree-like format.

The training is on what should be expected and then display the variation from normal/expected SaaS and/or Cloud activity. The first is a real-time or re-playable radial diagram where user activity is represented as paths between a series of nodes and their sub-nodes in a tree-like format or some other node structure (see FIG. 3). In FIG. 3, the nodes may represent files and folders, structured resources, or any finite sequence of events. In this example, user activity is represented as paths between these nodes from a central node, where dotted lines defines anomaly and line thickness represents frequency of use. For example, a user accesses files in a standard folder and the path is solid black. The user accesses files in an unusual folder and the path is dotted.

Alternatively, user activity may be represented as colored paths between these nodes from a central node, where color defines anomaly and line thickness represents frequency of use. For example, a user accesses files in a standard folder and the path is green. The user accesses files in an unusual folder and the path is red.

The line becomes thicker with doing that action more times. In live playback, the path persists for a short period of time. This allows an operator to playback user activity at speed and identify the anomalous activities amongst the noise of general user behavior.

The second proposition is for methods of representing user activity anomaly in a Cloud or SaaS environment. The anomaly score may be computed by an anomaly score classifier, such as the Network Sequence Prediction using Transformer deep learning model trained on SaaS and/or Cloud activity, that is, given a timeframe and an event type, and then the user activity is plotted as a series of points (potentially joined by a line) of event frequency against time.

The measure of anomaly score of user actual activity is shown in different colors and dot size. The graph can also display the expected number of the given event in the given timeframe. Using the output of the anomaly score classifier, the tolerance of the expected number of the given event in the given timeframe is plotted on the graph to show the "normal" range. The expected number of the given event in the given timeframe can be displayed as a line bar or an elliptical ring, etc. superimposed along with the actual data.

An operator using the user interface can therefore see at a glance when an activity broke the bounds of the "normal" range for frequency and timing. This same system and method can be applied to individual devices as well.

In both examples of visual representations, the visual representation allows a human led investigation of a large amount of user and/or device events occurring over a long timeframe to be analyzed by a human investigator quite rapidly. Patterns can be rapidly seen and caught by the human visually reviewing this.

Example 2—Applied Situation (Simplified)

In an applied situation, a SaaS event is rendered into a string which reads "Kim logs onto the company's network in London at 9.30 a.m. using a desktop device and accesses a current invoice".

The Transformer deep learning model predicts the network sequence which was expected, i.e. usually, "Kim logs onto the company's network from a location at the same time using a device and accesses invoices".

If, however, a different SaaS event is rendered into a different string such as "Kim logs onto the company's network in New York at 3.30 a.m. using a laptop device and accesses last year's invoice together with a confidential patent draft", the Transformer deep learning model identifies an anomaly in a part of the event in the sequence.

In turn, the Transformer deep learning model is able to report the anomaly, together with a notification of what was expected. In this situation, the Transformer deep learning model predicts that usually, "Kim logs onto the company's network in London at 9.30 a.m. using a desktop device and accesses current invoice", but now identifies that "Kim logs onto the company's network in New York at 3.30 a.m. using a laptop device and accesses last year's invoice and a confidential patent draft".

The different locations and times do not appear to be an anomaly because Kim still logs onto the company's network at the same time (taking into account time differences). The subject-matter "invoices" appears the similar and in turn does not appear to be an anomaly. Even further, use of "laptop device" over "desktop device" not appear to be anomaly because both devices were used interchangeably.

However, "Kim accessing a confidential patent draft" appears to be an anomaly above a given threshold amount. The output of the Transformer deep learning model comprises that (i) "Kim accessing a confidential patent draft" is an anomaly and (ii) it would have been expected that "Kim accesses invoices". Both (i) and (ii) in combination are valuable information which provide context to a human analyst on which he/she can make an informed decision on whether to act on the anomaly or not.

Additionally, the output of the Transformer deep learning model comprises (iii) a probability quantifying how certain the assessment is. This probability is expressed in percent [%]. In the present situation, the Transformer deep learning model reports a confidence level is 95% that "Kim accessing a confidential patent draft" is an anomaly.

In summary, the Transformer deep learning model reports that the anomaly is "Kim accesses a confidential patent draft"; however, it is expected that "Kim accesses invoices". The confidence level is 95%.

Additionally, the above information is displayed in a graph for assessment on a dashboard which further assists the decision-making of a human.

The human analyst is now in a position to immediately act on the anomaly or request additional information from a different system to confirm that Kim, for example, is currently on a business trip in the US; nonetheless, Kim regularly accesses invoices irrespective of the date but Kim does not engage with patent matters.

In the present example, the human analyst and/or an autonomous response module can decide that the access to the confidential patent draft would be restricted and a notification is sent to Kim's manager in line.

The Transformer deep learning model in the present example is not biased to a user identifier, e.g. a title/role/team, e.g. "Kim works in accounting", or a data identified, e.g. "confidential", which may introduce a bias.

In summary, a cyber threat defense system and a method for detecting a cyber threat may use a predictor, e.g. a Transformer deep learning model, which is configured to predict a next item in the sequence of events and to detect one or more anomalies in the sequence of events. This provides a notification comprising (i) information about the one or more anomalies; and (ii) a prediction of what would have been expected.

The analyzer module may also apply a user agent predictor to accurately match a JA3 hash to particular user agents in an enterprise immune system.

The User Agent Predictor Classifier

Additionally, or alternatively, the analyzer module may comprise a User Agent predictor classifier. More specifically, the analyzer module may comprise a user agent predictor to accurately match a JA3 hash to particular user agents in an enterprise immune system.

JA3 is a known methodology for connection fingerprinting by creating a hash of, for example, 5 decimal fields of the Client Hello message that is sent in the initial stages of a Transport Layer Security (TLS)/Secure Socket Layer (SSL)

session. The user agent can be a software agent that is acting on behalf of a user, such as a web browser that retrieves, renders and facilitates end user interaction with Web content, an email reader, etc. However, the user agent may be malware software.

It is an objective of the present invention to identify malware software.

The above objective is achieved by a user agent classifier which is configured to receive an input of JA3 hashes and domains and configured to output a likely user agent.

This provides an advantage over known cyber threat defense systems which can only determine the presence of a threat. In contrast, known cyber threat defense systems cannot predict the user agent, let alone predict the user agent together with a confidence score.

Advantageously, the present cyber threat defense system and methods for detecting a cyber threat comprise an user agent predictor classifier configured to receive an input of JA3 hashes and domains and configured to output a likely user agent. This presence of a user agent predictor classifier provides the benefit of predicting a user agent, optionally together with a confidence score. This provides additional context to the decision maker, which in turn saves time.

A cyber threat defense system may comprise: a user agent predictor classifier configured to: receive an input of hashes and domains; and output a likely user agent of the input.

A method of detecting a cyber threat may comprising a user agent predictor classifier: receiving an input of hashes and domains; and outputting a likely user agent of the input.

The cyber threat defense system and methods for detecting a cyber threat comprising an user agent predictor classifier may be part of an analyzer module, For example, the cyber threat defense system and methods for detecting a cyber threat comprising an user agent predictor classifier may be combined with cyber threat defense systems and methods comprising a an analyzer module configured to model network data as a sequence of events; and a predictor configured to predict a next item in the sequence of events and to detect one or more anomalies in the sequence of events, for example, wherein the predictor is a Transformer deep learning model.

Example 1—Training Process for the User Agent Predictor Classifier

A dataset of known JA3 client hashes, known JA3 server hashes, domains, and known user agents, can be used with a machine learning approach that is usually implemented for a feed forward neural network (FFNN). In an example, the User Agent predictor classifier can use a FFNN with natural language processing (NLP) in order to train the User Agent predictor classifier.

The training can use a set of known data from the SSL connection (supplies JA3 hashes and domains) and the HTTP connection (supplies user agent information) as input data and output data. In the training, the JA3 hashes for the client and the server in connection with domain information can be accurately matched to the initiating user agent information.

The classifier can be trained on data retrieved from a fleet of cyber security appliances each installed in its own network to examine connection data, including connection data from a proxy service. In an example, when a proxy is in use, an analysis of the HTTP connection can be analyzed to determine interactions with the communication before the SSL process. Using the HTTP connection information prior to the SSL process, the system can map or graph user agents and JA3 hashes for the same connection as well as supply this data for training. The classifier is trained on this data containing user agents matched to JA3 hashes and domains.

Example 2—Deployment of the User Agent Predictor Classifier

In the field when deployed, the classifier performs an analysis of JA3 hashes and their associated user-agents when monitoring and analysing a secured communication connection. Once trained and then deployed in the field, the user agent predictor classifier takes an input of JA3 hashes and domains determined from SSL connections and outputs a likely user agent initiating the connection. In the field when deployed, this User Agent predictor classifier takes an input of an unknown JA3 client hash, an unknown JA3 server hash, and a domain, and then outputs the most likely user agent and a confidence score. The JA3 hash information and domain information are derived from the SSL connection and (for the training process) the user agent derived from the HTTP.

Again, the User Agent predictor classifier analyzes JA3 hashes and domain information to correlate/predict their associated user agents from an SSL connection. This is a supervised machine learning approach to predict the likely process, such as a user agent, initiating a connection based upon i) the domain and ii) JA3 hashes seen in the SSL connection. The SSL connections generally do not show a user agent as well as JA3 hashes from a TLS/SSL session. JA3 hashes suffer from being rare, rather than unique. Many processes can produce the same JA3 hash.

After training, then the User Agent predictor classifier when deployed can give a notification of a predicted user agent, after examining the inputs from the connection from the SSL (JA3 hashes and domains obtained from the SSL). For example, based on the JA3s and domains from the SSL, then the User Agent predictor classifier outputs the predicted user agent, which for example, could be a 65% chance that the connection's user's agent was a McAfee end point agent. The User Agent predictor classifier can be an internal-only analyst tool and could be implemented as a customer-facing tool into the core of the cyber security appliance.

JA3 hashes can be used to identify the signatures of specific processes communicating with endpoints using TLS/SSL. However, as discussed, they are not unique (more like rare); and therefore, there can be significant uncertainty on the possible process, such as user agents, initiating a connection. Many processes can have the same JA3 hash. This User Agent predictor classifier implementation can be an intelligent approach which attempts to make a 'best guess' at the most likely user agent/process initiating the connection.

In general without the User Agent predictor classifier, when a JA3 hash is inputted into a Search component, the search component will output that many different possible 'processes' in the hash that could be the user agent—the i) browser e.g. Google Chrome, ii) an application or operating system on another user's device, iii) a proxy device/process, iv) a legitimate process initiating the communication, or v) an actual malware software. Many processes can interact with the communication from the user agent initiating the connection and generation of the communication through a same API to receipt of the communication in the end device in the organization's network.

Example 3—Correlation Elements with Platform's Advanced Search Component

In an example, the User Agent predictor classifier in the cyber security appliance correlates elements of a connection together in the platform's Advanced Search component—where a proxy is in use, the cyber security appliance observes the initial HTTP_CONNECT negotiation (contains a user agent) and the TLS connection (JA3 hashes and domain). Using this correlated data, for training, it was possible to create a dataset of user agents, JA3 hashes (client and server) and domains being accessed across a fleet of cyber security appliances. The user agent in general identifies the client software originating the request. The user agent operates in a network protocol, it can often identify itself, its application type, operating system, software vendor, or software revision, by submitting a characteristic identification string in a header of its communication to its operating peer. For the User Agent predictor classifier, the user agent can be simplified to the software name and Operating System version, where applicable. This is an important approach to gathering this dataset—in contrast, another implementation attempting to identify all possible user agents for a JA3 hash requires the user to navigate to an endpoint in their browser or running an endpoint agent, which monitors outgoing connections and is therefore heavily limited.

JA3S

Additionally, or alternatively, JA3S may be used. The JA3S method collects the decimal values of the bytes for the following fields in the Server Hello packet: Version, Accepted Cipher, and List of Extensions. It then concatenates those values together in order, using a "," to delimit each field and a "–" to delimit each value in each field. These strings may be MD5 hashed to produce an easily consumable and shareable 32 character fingerprint, i.e. the JA3S Fingerprint.

DETAILED DESCRIPTION

A cyber threat defense system may comprise: a user agent predictor classifier configured to: receive an input of hashes and domains; and output a likely user agent of the input.

A cyber threat defense system may comprise an user agent predictor classifier configured to receive an input of JA3 hashes and domains and configured to output a likely user agent.

A method of detecting a cyber threat may comprising a user agent predictor classifier: receiving an input of hashes and domains; and outputting a likely user agent of the input.

The user agent may be a user in the enterprise immune system. For example, the user agent may be (i) browser, (ii) application or operating system of another user's device, (iii) a proxy device and/or process, (iv) a legitimate process initiating communication, and/or (v) malware software.

The user agent predictor classifier may be configured to receive an input of JA3 hashes from a SSL connection. For example, the user agent predictor classifier may be configured to receive an input of user agent information from an HTTP connection. Optionally, the user agent predictor classifier may be configured to output a likely user agent initiating the connection. Optionally, the output may be one or more of the following (i) browser, (ii) application or operating system of another user's device, (iii) a proxy device and/or process, (iv) a legitimate process initiating communication, and/or (v) malware software.

The user agent predictor classifier may be configured to receive an input of JA3 hashes and domain information to correlate/predict their associated user agents from an SSL connection.

The user agent predictor may be a search component. The user agent predictor may be a search component configured to output one or more of the following (i) browser, (ii) application or operating system of another user's device, (iii) a proxy device and/or process, (iv) a legitimate process initiating communication, and/or (v) malware software.

The user agent predictor classifier may be configured to output a confidence score about the likely user agent. For example, the confidence score may be 0%, 10%, 20%, 30%, 40%, 50%, 60%, 70%, 80%, 90%, 91%, 92%, 93%, 94%, 95%, 96%, 97%, 98%, 99% and/or 100%.

The user agent predictor classifier may be configured to output as an internal-only analyst tool. Alternatively, or additionally, the user agent predictor classifier may be configured to output as a customer-facing tool.

The user agent may operate in a network protocol.

There is also provide a method for detecting a cyber threat, the method comprising: using an user agent predictor classifier to receive an input of JA3 hashes and domains and to output a likely user agent.

The user agent predictor classifier may receive an input of JA3 hashes from a SSL connection. The user agent predictor classifier may receive an input of user agent information from an HTTP connection.

The user agent predictor classifier may output a likely user agent initiating the connection. The user agent predictor classifier may output one or more of the following (i) browser, (ii) application or operating system of another user's device, (iii) a proxy device and/or process, (iv) a legitimate process initiating communication, and/or (v) malware software.

The user agent predictor classifier may receive an input of JA3 hashes and domain information to correlate/predict their associated user agents from an SSL connection.

The user agent predictor may comprise a search component. The user agent predictor comprises a search component configured to output one or more of the following (i) browser, (ii) application or operating system of another user's device, (iii) a proxy device and/or process, (iv) a legitimate process initiating communication, and/or (v) malware software.

The user agent predictor classifier may output a confidence score about the likely user agent. For example, the confidence score may be 0%, 10%, 20%, 30%, 40%, 50%, 60%, 70%, 80%, 90%, 91%, 92%, 93%, 94%, 95%, 96%, 97%, 98%, 99% and/or 100%.

The user agent predictor classifier may output as an internal-only analyst tool and/or as a customer-facing tool.

The user agent may operate in a network protocol.

The user agent predictor to accurately match a JA3 hash to particular user agents in an enterprise immune system may be define by the numbered clauses below.

The AI models use data sources, such as simulations, database records, and actual monitoring of different human exemplar cases, as input to train the AI model on how to make a decision. The analyzer module also may utilize repetitive feedback, as time goes on, for the AI models trained with machine learning on possible cyber threats via reviewing a subsequent resulting analysis of the supported possible cyber threat hypothesis and supply that information to the training of the AI models trained with machine learning on possible cyber threats in order to reinforce the model's finding as correct or inaccurate.

Each hypothesis has various supporting points of data and other metrics associated with that possible threat, and a machine learning algorithm will look at the relevant points of data to support or refute that particular hypothesis of what the suspicious activity and/or abnormal behaviour relates to.

The analyzer module may perform analysis of internal and external data including readout from machine learning models, which output a likelihood of the suspicious activity and/or abnormal behaviour related for each hypothesis on what the suspicious activity and/or abnormal behaviour relates to with other supporting data to support or refute that hypothesis.

The assessment module may assign a probability, or confidence level, of a given cyber threat hypothesis that is supported, and a threat level posed by that cyber threat hypothesis, which includes this abnormal behaviour or suspicious activity, with the one or more AI models trained on possible cyber threats. The assessment module can cooperate with the autonomous response module to determine an appropriate response to mitigate various cyber-attacks that could be occurring.

The analyzer module can reference machine learning models that are trained on the normal behaviour of email activity and user activity associated with at least the email system, where the analyzer module cooperates with the assessment module to determine a threat risk parameter that factors in 'the likelihood that a chain of one or more unusual behaviours of the email activity and user activity under analysis fall outside of derived normal benign behaviour;' and thus, are likely malicious behaviour.

Figure 4:
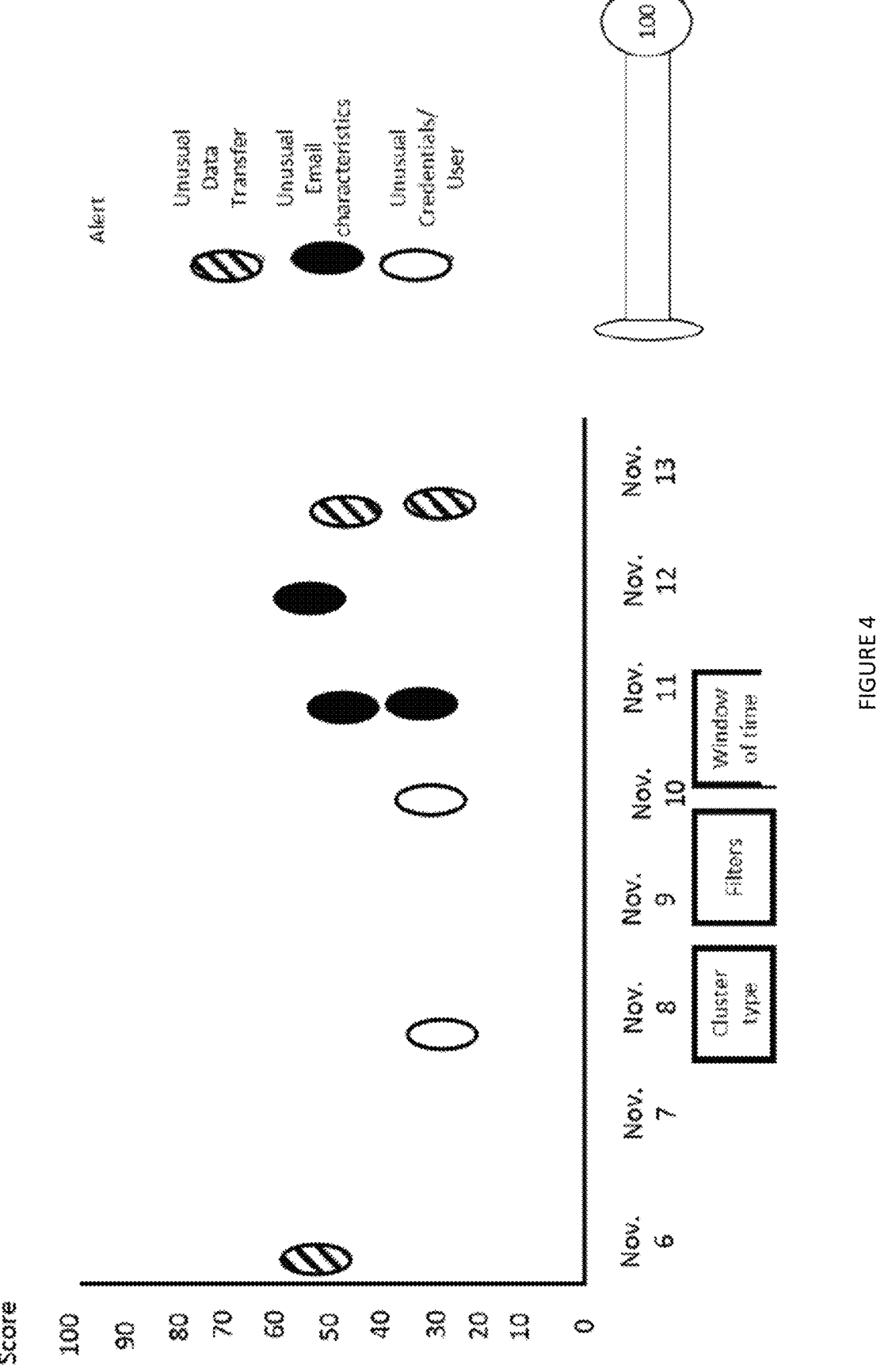
FIG. 4 illustrates a block diagram of an embodiment of an example chain of unusual behaviour for the email(s) deviating from a normal pattern of life in connection with the rest of the network under analysis.

In an example, a behavioural pattern analysis of what are the unusual behaviours of the network/system/device/user under analysis by the machine learning models may be as follows. The cyber security appliance uses unusual behaviour deviating from the normal behaviour and then builds a chain of unusual behaviour and the causal links between the chain of unusual behaviour to detect cyber threats (for example see FIG. 4). FIG. 4 illustrates a block diagram of an embodiment of an example chain of unusual behaviour for the email(s) deviating from a normal pattern of life in connection with the rest of the network under analysis. The unusual pattern can be determined by filtering out what activities/events/alerts that fall within the window of what is the normal pattern of life for that network/system/device/ user under analysis, and then the pattern of the behaviour of the activities/events/alerts that are left, after the filtering, can be analyzed to determine whether that pattern is indicative of a behaviour of a malicious actor-human, program, or other threat. Next, the cyber security appliance can go back and pull in some of the filtered out normal activities to help support or refute a possible hypothesis of whether that pattern is indicative of a behaviour of a malicious actor. The analyzer module can cooperate with one or more models trained on cyber threats and their behaviour to try to determine if a potential cyber threat is causing these unusual behaviours. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance is configurable in a user interface, by a user, enabling what type of automatic response actions, if any, the cyber security appliance may take when different types of cyber threats, indicated by the pattern of behaviours under analysis, that are equal to or above a configurable level of threat posed by this malicious actor.

The AI models may perform by the threat detection through a probabilistic change in a normal behaviour through the application of an unsupervised Bayesian mathematical model to detect behavioural change in computers and computer networks. The core threat detection system is termed the 'Bayesian probabilistic'. The Bayesian probabilistic approach can determine periodicity in multiple time series data and identify changes across single and multiple time series data for the purpose of anomalous behaviour detection. From the email and potentially IT network raw sources of data, a large number of metrics can be derived each producing time series data for the given metric.

The detectors in the analyzer module including its network module (simulator can get extract meta data from network module) and email module components can be discrete mathematical models that implement a specific mathematical method against different sets of variables with the target. Thus, each model is specifically targeted on the pattern of life of alerts and/or events coming from, for example, i) that cyber security analysis tool analysing various aspects of the emails, iii) coming from specific devices and/or users within a system, etc.

At its core, the cyber security appliance 100 mathematically characterizes what constitutes 'normal' behaviour in line with the normal pattern of life for that entity and organization based on the analysis of a large number/set of different measures of a device's network behaviour. The cyber security appliance 100 can build a sophisticated 'pattern of life'—that understands what represents normality for every person, device, email activity, and network activity in the system being protected by the cyber security appliance 100.

The assessment module may rank supported candidate cyber threat hypotheses by a combination of likelihood that this candidate cyber threat hypothesis is supported as well as a severity threat level of this incident type.

The formatting module can be coded to generate the report with the identified critical devices connecting to the virtualized instance of the network that should have the priority to allocate security resources to them, along with one or more portions of the constructed graph. The formatting module can have an autonomous email-report composer that cooperates with the various AI models and modules of the cyber security appliance 100 as well as at least a set of one or more libraries of sets of prewritten text and visual representations to populate on templates of pages in the email threat report. The autonomous email-report composer can compose an email threat report on cyber threats that is composed in a human-readable format with natural language prose, terminology, and level of detail on the cyber threats aimed at a target audience being able to understand the terminology and the detail. The modules and AI models cooperate with the autonomous email-report composer to indicate in the email threat report, for example, an email attack's 1) purpose and/or 2) targeted group (such as members of the finance team, or high-level employees).

The formatting module may format, present a rank for, and output the current email threat report, from a template of a plurality of report templates, that is outputted for a human user's consumption in a medium of, any of 1) a printable report, 2) presented digitally on a user interface, 3) in a machine readable format for further use in machine-learning reinforcement and refinement, and 4) any combination of the three.

The system may use at least three separate machine learning models. For example, a machine learning model may be trained on specific aspects of the normal pattern of life for entities in the system, such as devices, users, network traffic flow, outputs from one or more cyber security analysis tools analysing the system, etc. One or more machine learning models may also be trained on characteristics and aspects of all manner of types of cyber threats. One or more machine learning models may also be trained on composing email threat reports.

The various modules cooperate with each other, the AI models, and the data store to carry out the operations discussed herein. The trigger module, the AI models, the gatherer module, the analyzer module, the assessment module, the formatting module, and the data store cooperate to improve the analysis and formalized report generation with less repetition to consume less CPU cycles, as well as doing this more efficiently and effectively than humans. For example, the modules can repetitively go through these steps and re-duplicate steps to filter and rank the one or more supported possible cyber threat hypotheses from the possible set of cyber threat hypotheses and/or compose the detailed information to populate into the email threat report.

One or more processing units are configured to execute software instructions associated with the intelligent-adversary simulator, the formatting module, other modules, and models in the cyber security appliance 100.

One or more non-transitory storage mediums are configured to store at least software associated with the intelligent-adversary simulator, the other modules, and AI models.

Figure 5:
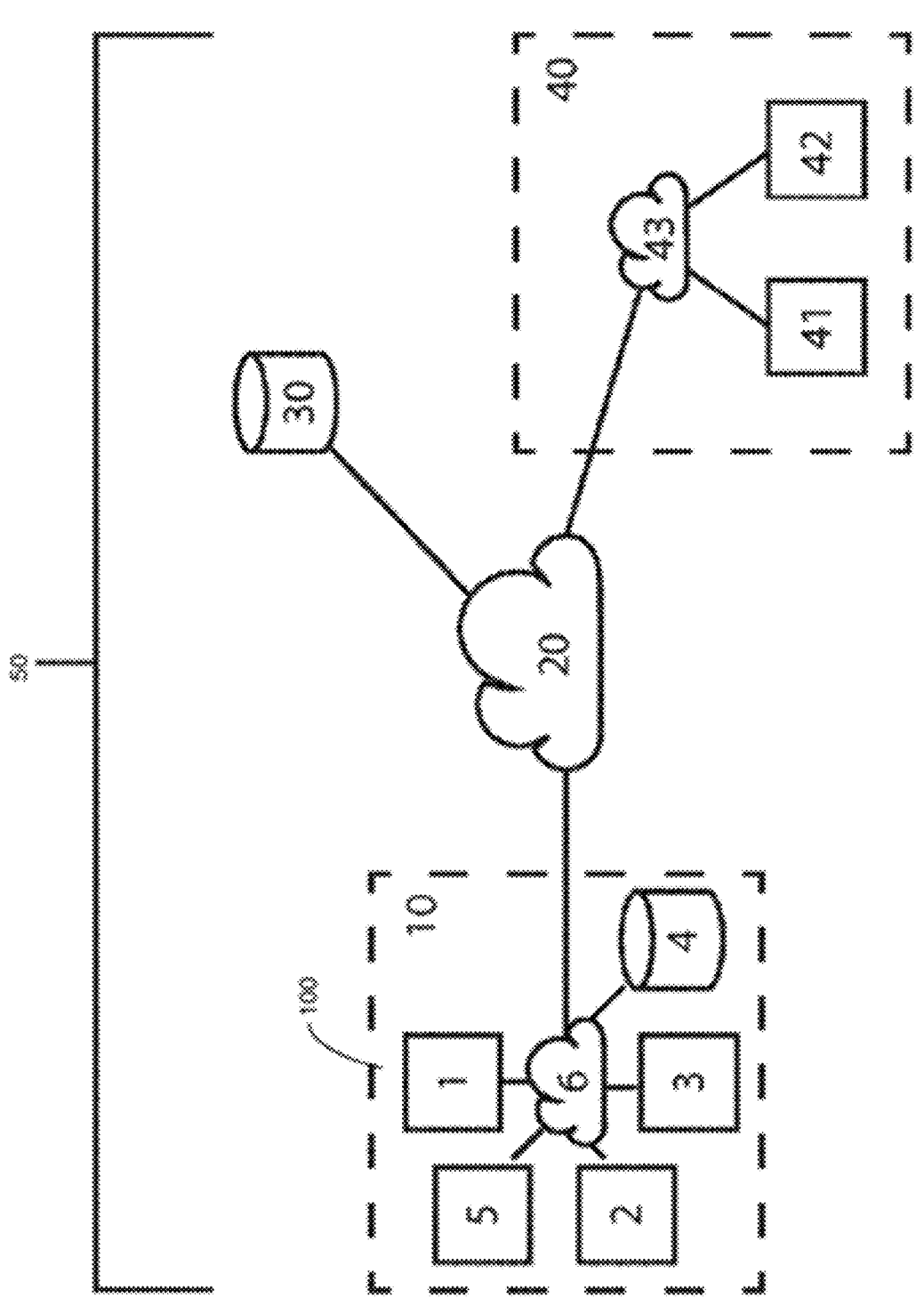
FIG. 5 illustrates an example cyber security appliance to protect an example network, in which the example network of computer systems uses a cyber security appliance.

FIG. 5 illustrates an example cyber security appliance to protect an example network. The example network of computer systems 50 uses a cyber security appliance 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 100, computer 1 on the first computer system 10 has the hardware and software of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information from the lightweight probes.

The cyber security appliance 100 in computer 1 builds and maintains a dynamic, ever-changing model of the 'normal behaviour' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The threat detection system takes all the information that is available relating to this employee and establishes a 'pattern of life' for that person and the devices used by that person in that system, which is dynamically updated as more information is gathered. The 'normal' of the model of the normal pattern of life is used as a moving benchmark, allowing the system to spot behaviour on a system that seems to fall outside of this normal pattern of life, and flags this behaviour as anomalous, requiring further investigation.

The cyber security appliance 100 is built to deal with the fact that today's attackers are getting stealthier and an attacker/malicious agent may be 'hiding' in a system to ensure that they avoid raising suspicion in an end user, such as by slowing their machine down.

The cyber security appliance builds a sophisticated 'pattern of life'—that understands what represents normality for every person, device, and network activity in the system being protected by the cyber security appliance 100.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The system does not always know what it is looking for, but can independently classify data and detect compelling patterns.

The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behaviour to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 100 can use a Recursive Bayesian Estimation. To combine these multiple analyzes of different measures of network behaviour to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviours where conventional signature-based methods fall down.

Training a model can be accomplished by having the model learn good values for all of the weights and the bias for labelled examples created by the system, and in this case;

starting with no labels initially. A goal of the training of the model can be to find a set of weights and biases that have low loss, on average, across all examples.

An anomaly detection technique that can be used is supervised anomaly detection that requires a data set that has been labelled as "normal" and "abnormal" and involves training a classifier. Another anomaly detection technique that can be used is an unsupervised anomaly detection that detects anomalies in an unlabelled test data set under the assumption that the majority of the instances in the data set are normal, by looking for instances that seem to fit least to the remainder of the data set. The model representing normal behaviour from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The method, apparatus and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

Figure 6:
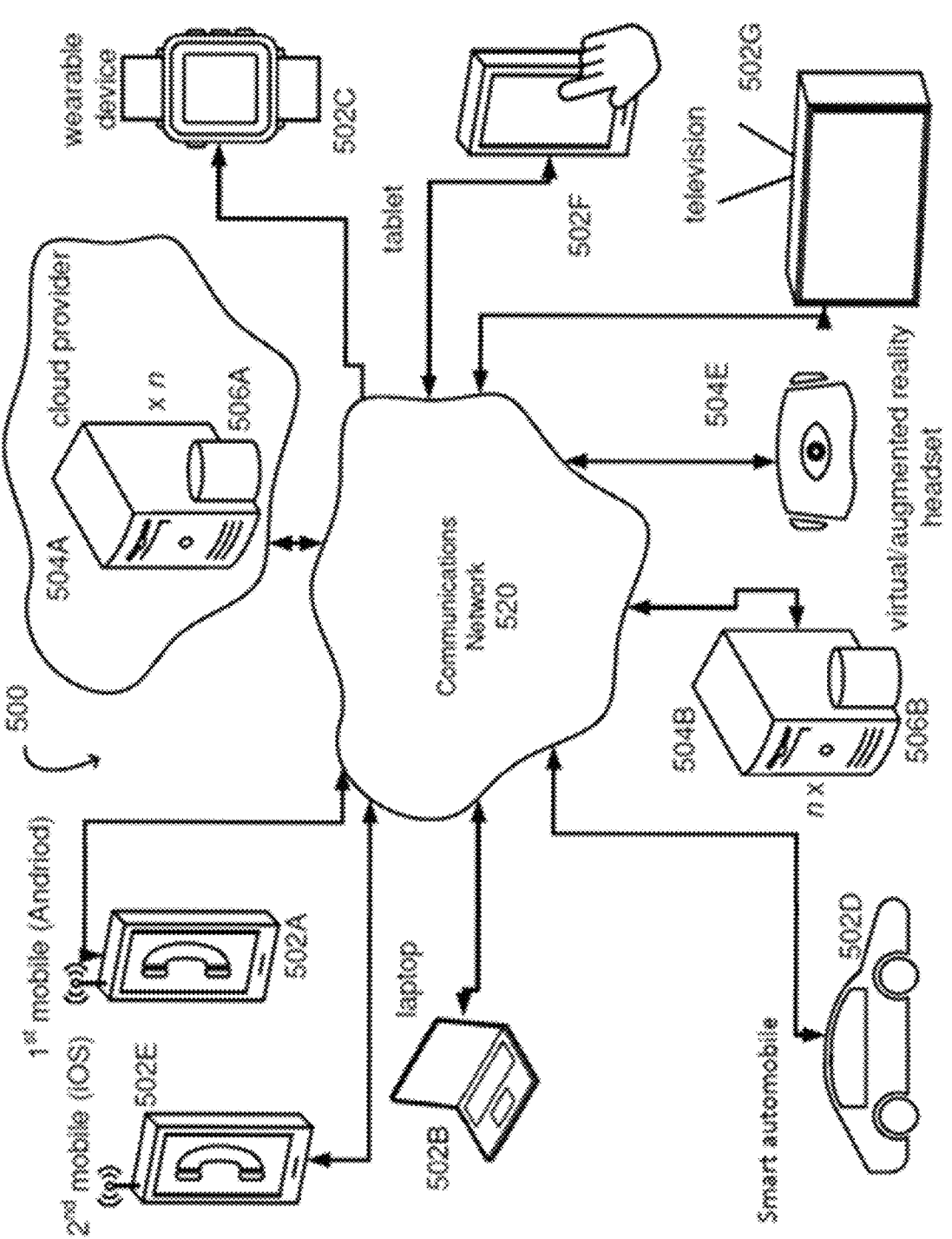
FIG. 6 illustrates a block diagram of a number of electronic systems and devices communicating with each other in a network environment in accordance with an embodiment of the current design.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves. Network FIG. 6 illustrates a block diagram of a number of electronic systems and devices communicating with each other in a network environment in accordance with an embodiment of the current design.

The network environment has a communications network 520 that connects server computing systems 504A through 504B, and at least one or more client computing systems 502A to 502G. As shown, there may be many server computing systems 504A through 504B and many client computing systems 502A to 502G connected to each other via the network 520, which may be, for example, the Internet. Note, that alternatively the network 520 might be or include one or more of: an optical network, a cellular network, the Internet, a Local Area Network (LAN), Wide Area Network (WAN), satellite link, fiber network, cable network, or a combination of these and/or others. Each server computing systems 504A-504B can have circuitry and software to communication with the other server computing systems 504A through 504B and the client computing systems 502A to 502G across the network 520. Each server computing systems 504A to 504B can be associated with one or more databases 506A to 506B. Each server 504A to 504B may have one or more instances of a virtual server running on that physical server and multiple virtual instances may be implemented by the design. A firewall may be established between a client computing system, for example, 502D and the network 520 to protect data integrity on the client computing system 502D.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicated use of these resources. The user's cloud-based site is given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

The cloud-based remote access is coded to utilize a protocol, such as Hypertext Transfer Protocol (HTTP), to engage in a request and response cycle with both a mobile device application resident on a client device, 502A-502G, as well as a web-browser application resident on the client device, 502A-502G. In some situations, the cloud-based remote access for a wearable electronic device 502C, can be accessed via a mobile device, a desktop, a tablet device, cooperating with that wearable electronic device 502C. The cloud-based remote access between a client device 502A-502G and the cloud-based provider site 504A is coded to engage in one or more of the following 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based remote access to a wearable electronic device, and 5) combinations of these.

In an embodiment, the server computing system 504A may include a server engine, a web page management component or online service or online app component, a content management component, and a database management component. The server engine performs basic processing and operating system level tasks. The web page management component, online service, or online app component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

Computing Devices

Figure 7:
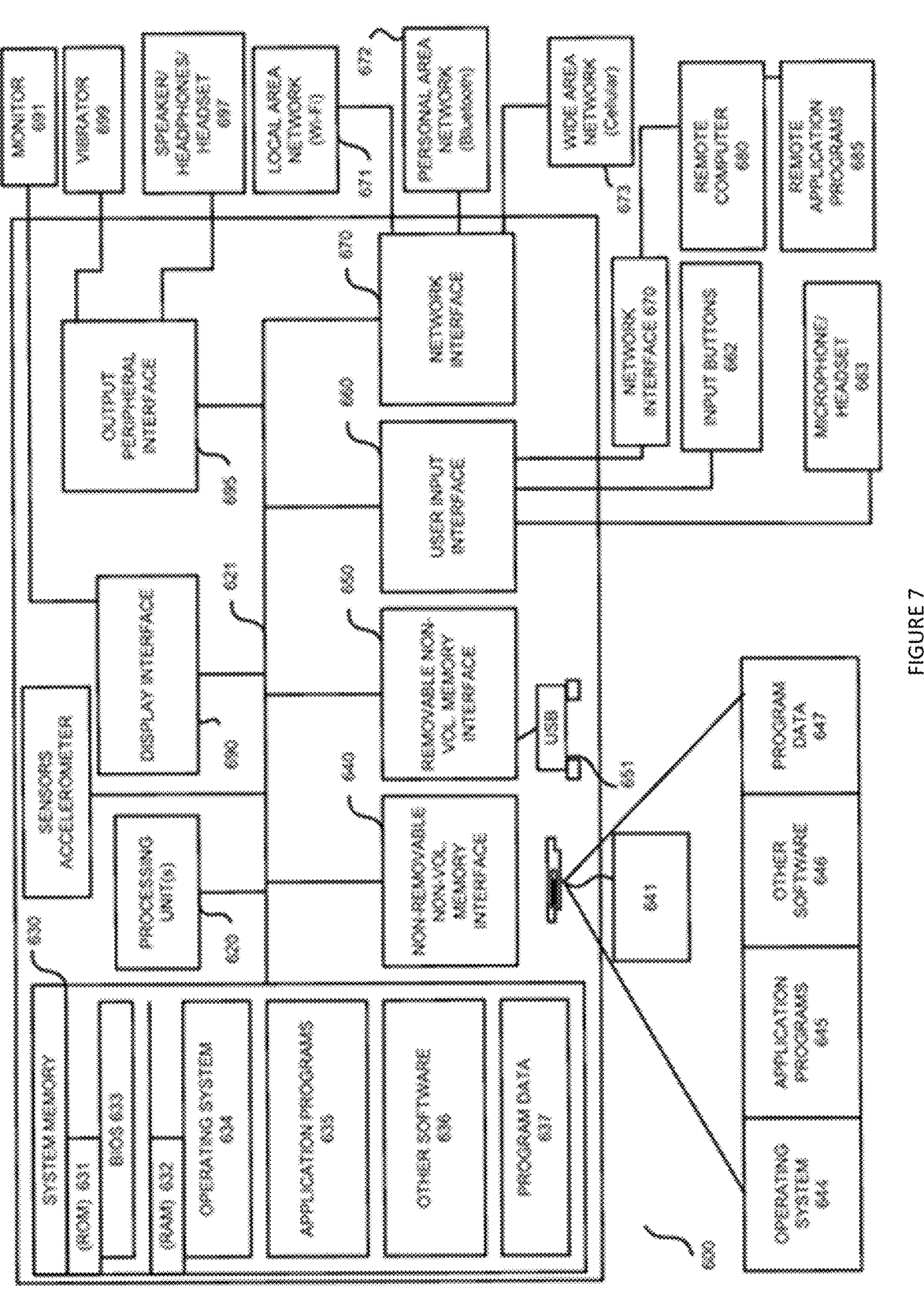
FIG. 7 illustrates a block diagram of an embodiment of one or more computing devices that can be a part of the conversational assistant for an embodiment of the current design discussed herein.

FIG. 7 illustrates a block diagram of an embodiment of one or more computing devices that can be a part of the conversational assistant for an embodiment of the current design discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where a notification from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 602. Transitory media such as wireless channels are not included in the machine-readable media. Machine-readable media typically embody computer readable instructions, data structures, and other executable software.

In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through a notification peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used.

It should be noted that the present design can be carried out on a computing device such as that described with respect to this Figure. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. A module may be implemented in hardware electronic components, software components, and a combination of both.

Generally, an application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

Embodiments of the invention may be described by the following numbered clauses.

CLAUSES

1. A cyber threat defense system, the cyber threat defense system comprising:
   a user agent predictor classifier configured to:
   receive an input of hashes and domains; and
   output a likely user agent of the input.
2. The cyber threat defense system according to clause 1, wherein the hashes are JA3 hashes.
3. The cyber threat defense system according to clause 1 or 2, wherein the user agent predictor classifier is configured to receive an input of JA3 hashes from an SSL connection and/or wherein the user agent predictor classifier is configured to receive an input of user agent information from an HTTP connection and/or wherein the user agent predictor classifier is configured to output a likely user agent initiating a connection.
4. The cyber threat defense system according to any preceding clause, wherein the user agent predictor classifier is configured to output a likely user agent comprising one or more of the following (i) a browser, (ii) an application or operating system of another user's device, (iii) a proxy device and/or process, (iv) a legitimate process initiating communication, and/or (v) malware software.
5. The cyber threat defense system according to any preceding clause, wherein the user agent predictor classifier is configured to receive an input of JA3 hashes and domain information to correlate/predict their associated user agents from an SSL connection.
6. The cyber threat defense system according to any preceding clause, wherein the user agent predictor classifier comprises a search component configured to output a likely user agent.
7. The cyber threat defense system according to any preceding clause configured to output a likely user agent comprising one or more of the following (i) browser, (ii) an application or operating system of another user's device, (iii) a proxy device and/or process, (iv) a legitimate process initiating communication, and/or (v) malware software.
8. The cyber threat defense system according to any preceding clause, wherein the user agent predictor classifier is configured to output a confidence score about the likely user agent.

9. The cyber threat defense system according to any preceding clause, wherein the user agent predictor classifier is configured to output to an internal-only analyst tool and/or wherein the user agent predictor classifier is configured to output to a customer-facing tool.

10. The cyber threat defense system according to any preceding clause, wherein the user agent operates in a network protocol.

11. A method of detecting a cyber threat, the method comprising a user agent predictor classifier:
receiving an input of hashes and domains; and
outputting a likely user agent of the input.

12. The method according to clause 11, wherein the hashes are JA3 hashes.

13. The method according to clause 11 or 12, wherein the receiving comprises a user agent predictor classifier receiving an input of JA3 hashes from an SSL connection and/or the user agent predictor classifier receiving an input of user agent information from an HTTP connection.

14. The method according to any of clauses 11 to 13, wherein the outputting comprises the user agent predictor classifier outputting a likely user agent initiating the connection.

15. The method according to any of clauses 11 to 14, wherein the likely user agent comprises one or more of the following (i) browser, (ii) application or operating system of another user's device, (iii) a proxy device and/or process, (iv) a legitimate process initiating communication, and/or (v) malware software.

16. The method according to any of clauses 11 to 15, wherein the user agent predictor classifier receiving an input of hashes and domains comprises receiving an input of JA3 hashes and domain information to correlate/predict their associated user agents from an SSL connection.

17. The method according to any of clauses 11 to 16, wherein the user agent predictor comprises a search component.

18. The method according to any of clauses 11 to 17, wherein the user agent predictor comprises a search component configured to output one or more of the following (i) browser, (ii) application or operating system of another user's device, (iii) a proxy device and/or process, (iv) a legitimate process initiating communication, and/or (v) malware software.

19. The method according to any of clauses 11 to 18, wherein the user agent predictor classifier outputs a confidence score about the likely user agent.

20. The method according to any of clauses 11 to 19, wherein the user agent predictor classifier outputs as an internal-only analyst tool and/or wherein the user agent predictor classifier outputs as a customer-facing tool or wherein the user agent operates in a network protocol.

21. A non-transitory computer-readable medium including executable instructions that, when executed with one or more processors, cause a cyber-threat defense system to perform the method of any of clauses 11 to 20.

22. A cyber threat defense system, the cyber threat defense system comprising:
an analyzer module comprising a modeler to model network data as a sequence of events, and a predictor to predict a next item in the sequence of events and to identify one or more anomalies in the sequence of events;

a user interface configured to convey a notification of one or more anomalies occurring in a network protected by the cyber threat defense system;
an autonomous response module configured to generate at least a notification in response to the analyzer module identifying the one or more anomalies; and
wherein the predictor is configured to provide in the notification conveyed on the user interface (i) information about the one or more anomalies, and ii) additional contextual information, beyond a possible score, about the one or more anomalies in order to enhance a user's understanding regarding the identified one or more anomalies.

23. The cyber threat defense system according to claim 22, wherein the autonomous response module is configured to generate at least the notification to a user in response to detected one or more anomalies above a first threshold level and/or configured to generate an autonomous response to mitigate a cyber threat when the detected one or more anomalies are indicative above a second threshold level.

24. The cyber threat defense system according to clause 22 or 23, wherein the predictor is a Transformer deep learning model.

25. The cyber threat defense system according to any of clauses 22 to 24, wherein the additional contextual information identifies each anomalous part of an event in the sequence of events.

26. The cyber threat defense system according to any of clauses 22 to 25, wherein the additional contextual information identifies a plurality of anomalies in parts of an event in a sequence of events, when multiple anomalies were detected with the identified one or more anomalies in the sequence of events.

27. The cyber threat defense system according to any of clauses 22 to 26, wherein the predictor is configured to generate likelihoods for anomaly detection and then present the likelihood for the anomaly detection on the user interface.

28. The cyber threat defense system according to any of clauses 22 to 27, wherein the additional contextual information comprises (i) information about the anomaly, (ii) a prediction of what would have been expected and/or (iii) likelihoods for anomaly detection.

29. The cyber threat defense system according any of clauses 22 to 28, wherein the predictor is configured to provide a notification comprising an anomaly score in addition to the additional contextual information about the one or more anomalies.

30. The cyber threat defense system according to according to any of clauses 22 to 29, wherein the sequence of events is string data.

31. The cyber threat defense system according to any of clauses 22 to 30, wherein the sequence of events is string data derived from an SaaS event.

32. The cyber threat defense system according to any of clauses 22 to 31, wherein the predictor is further configured to match a JA3 hash of the network data to particular user agents; and to provide in the notification information about the particular user agents.

33. A method of detecting a cyber threat, the method comprising:
using a modeler to model network data as a sequence of events;
using a predictor to predict a next item in the sequence of events and to identify one or more anomalies in the sequence of events;

a user interface conveying a notification of the one or more anomalies occurring in a network protected by a cyber threat defense system;

generating at least a notification in response to the predictor identifying the one or more anomalies, the notification conveying on the user interface (i) information about the one or more anomalies, and ii) additional contextual information, beyond a possible score, about the one or more anomalies in order to enhance a user's understanding regarding the identified one or more anomalies.

34. The method according to clause 33, wherein the predictor is a Transformer deep learning model.

35. The method according to clause 33 or clause 34, wherein the additional contextual information identifies each anomalous part of an event in the sequence of events.

36. The method according to any of clauses 33 to 35, wherein the additional contextual information identifies a plurality of anomalies in parts of an event in a sequence of events, when multiple anomalies were detected with the identified one or more anomalies in the sequence of events.

37. The method according to any of clauses 33 to 36, further comprising the predictor generating likelihoods for anomaly detection and then present the likelihood for the anomaly detection on the user interface.

38. The method according to any of clauses 33 to 37, wherein the additional contextual information comprises (i) information about the anomaly, (ii) a prediction of what would have been expected and/or (iii) likelihoods for anomaly detection.

39. The method according to any of clauses 33 to 38, wherein the predictor runs on data in series.

40. The method according to any of clauses 33 to 39, wherein the predictor runs on data in parallel.

41. The method according to any of clauses 33 to 40, wherein the sequence of events is string data derived from a SaaS event.

42. The method according to any of clauses 33 to 41, further comprising using the predictor to match a JA3 hash of the network data to particular user agents; and to provide in the notification information about the particular user agents.

43. A non-transitory computer-readable medium including executable instructions that, when executed with one or more processors, cause a cyber-threat defense system to perform the method of any of clauses 33 to 42.

The invention claimed is:

1. A cyber threat defense system, the cyber threat defense system comprising:

one or more processors; and a non-transitory storage medium communicatively coupled to the one or more processors, the non-transitory storage medium comprises an analyzer module configured to model network data as a sequence of events, a model communicatively coupled to the analyzer module, the model is configured to (i) identify one or more anomalous parts of an event of the sequence of events as being indicative of an anomaly and (ii) generate a notification including (a) the one or more anomalous parts of the event, (b) an expected part of the event, and (c) a confidence score that the one or more anomalous parts is an anomaly, and a user interface configured to generate a visual representation based on content within the notification of the one or more anomalous parts being indicative of an anomaly occurring in a network protected by the cyber threat defense system; and an autonomous response module configured to generate a user notification or an automatic response action in response to the analyzer module identifying the one or more anomalous parts;

wherein the model is configured to provide in the notification conveyed for visual display on the user interface, where the notification includes (i) information associated with the one or more anomalous parts along with additional contextual information for the one or more anomalous parts, including (ii) the expected part of the event and (iii) the confidence score, in order to enhance a user's understanding regarding the identified one or more anomalous parts.

2. The cyber threat defense system according to claim 1, wherein the autonomous response module is configured to generate at least the notification to a user in response to detected one or more anomalous parts above a first threshold level and/or configured to generate an autonomous response to mitigate a cyber threat when the detected one or more anomalous parts are indicative above a second threshold level.

3. The cyber threat defense system according to claim 1, wherein the model corresponds to a deep learning model.

4. The cyber threat defense system according to claim 1, wherein the additional contextual information identifies each anomalous part of an event in the sequence of events.

5. The cyber threat defense system according to claim 1, wherein the additional contextual information identifies a plurality of anomalies in parts of an event in a sequence of events, when multiple anomalies were detected with the identified one or more anomalous parts in the sequence of events.

6. The cyber threat defense system according to claim 1, wherein the model is configured to generate likelihoods for anomaly detection and then present the likelihood for the anomaly detection on the user interface.

7. The cyber threat defense system according to claim 1, wherein the additional contextual information comprises (i) information about the one or more anomalous parts, (ii) a prediction of what would have been expected and/or (iii) likelihoods for anomaly detection.

8. The cyber threat defense system according to claim 1, wherein the model is configured to provide a notification comprising an anomaly score in addition to the additional contextual information about the one or more anomalous parts.

9. The cyber threat defense system according to claim 1, wherein the sequence of events is string data.

10. The cyber threat defense system according to claim 1, wherein the sequence of events is string data derived from a SaaS event.

11. A method of detecting a cyber threat, the method comprising:

transforming, by a modeler, network data as a sequence of events;

predicting, by a predictor, a next item in the sequence of events identifying, by the predictor one or more anomalous parts of an event of the sequence of events as being indicative of an anomaly;

generating, by the predictor, a notification including (a) information corresponding to the one or more anomalous parts of the event and (b) context information associated with the one or more anomalous parts including (i) information corresponding to an expected part of the event and (ii) a confidence score that the one or more anomalous parts is an anomaly; and generating, by a user interface, a visual representation based on content within the notification including the context information associated with the one or more anomalous parts occurring in a network protected by a cyber threat defense system, the information corresponding to the expected part of the event and the confidence score in order to enhance a user's understanding regarding the identified one or more anomalous parts.

12. The method according to claim 11, wherein the predictor is a Transformer deep learning model.

13. The method according to claim 11, wherein the contextual information identifies each anomalous part of an event in the sequence of events.

14. The method according to claim 11, wherein the contextual information identifies a plurality of anomalies in parts of the event in a sequence of events, when the plurality of anomalies were detected with the identified one or more anomalies in the sequence of events.

15. The method according to claim 11, further comprising the predictor generating likelihoods for anomaly detection and then present the likelihood for the anomaly detection on the user interface.

16. The method according to claim 11, wherein the contextual information comprises (i) information about the one or more anomalous parts, (ii) the expected part of the event representing a prediction of what would have been expected as parts of the event, and (iii) the confidence score representing a likelihood for anomaly detection.

17. The method according to claim 11, wherein the sequence of events is string data derived from a SaaS event.

18. The method according to claim 11, further comprising using the predictor to match a JA3 hash of the network data to particular user agents; and to provide in the notification information about the particular user agents.

19. A non-transitory computer-readable medium including executable instructions that, when executed with one or more processors, cause a cyber-threat defense system to perform the method of claim 11.

* * * * *